April 30, 1957 T. L. FAWICK 2,790,634
PNEUMATIC CUSHIONING ASSEMBLY FOR VEHICLES AND THE LIKE
Filed June 23, 1955 2 Sheets-Sheet 1
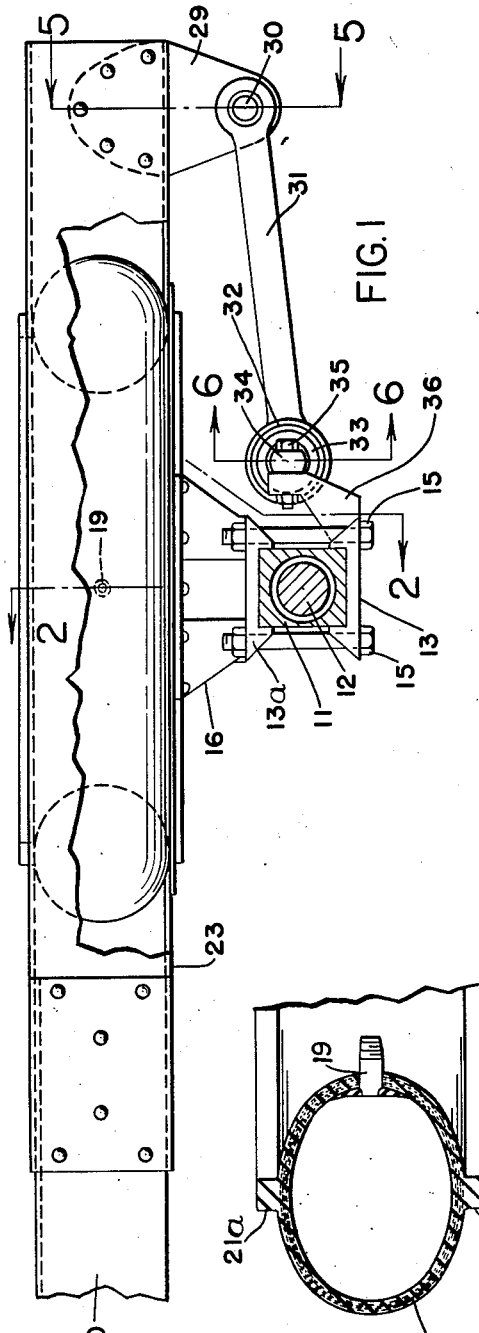
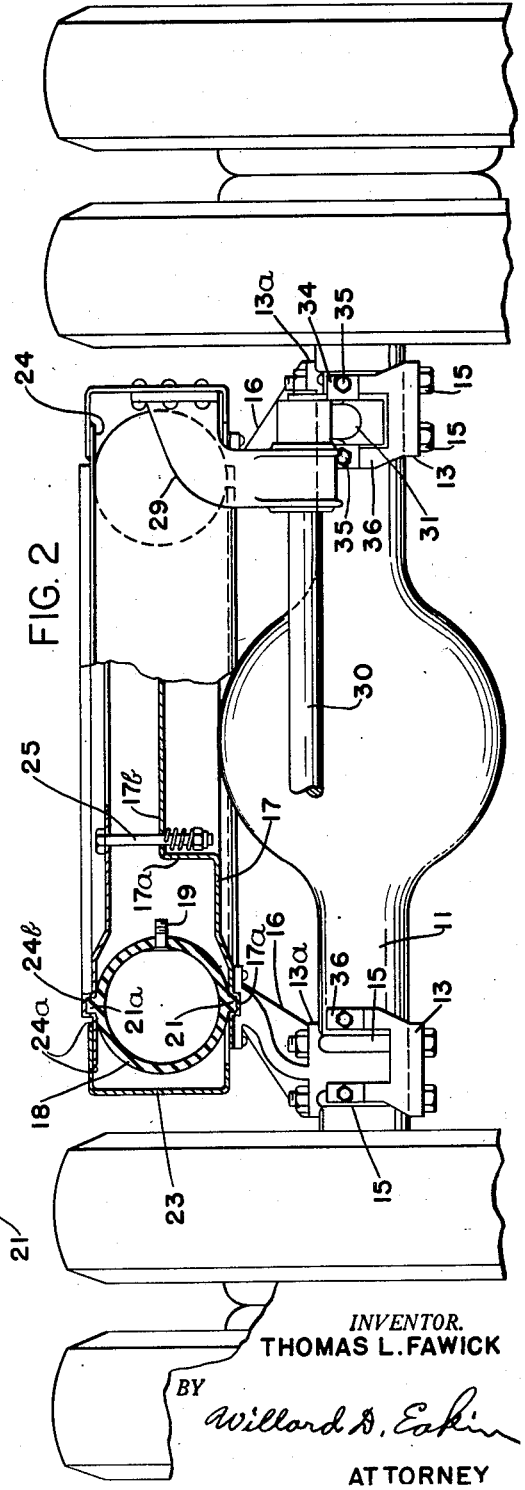
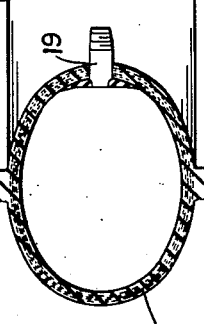
INVENTOR.
THOMAS L. FAWICK
BY
Willard D. Eakin
ATTORNEY April 30, 1957 T. L. FAWICK 2,790,634
PNEUMATIC CUSHIONING ASSEMBLY FOR VEHICLES AND THE LIKE
Filed June 23, 1955 2 Sheets-Sheet 2
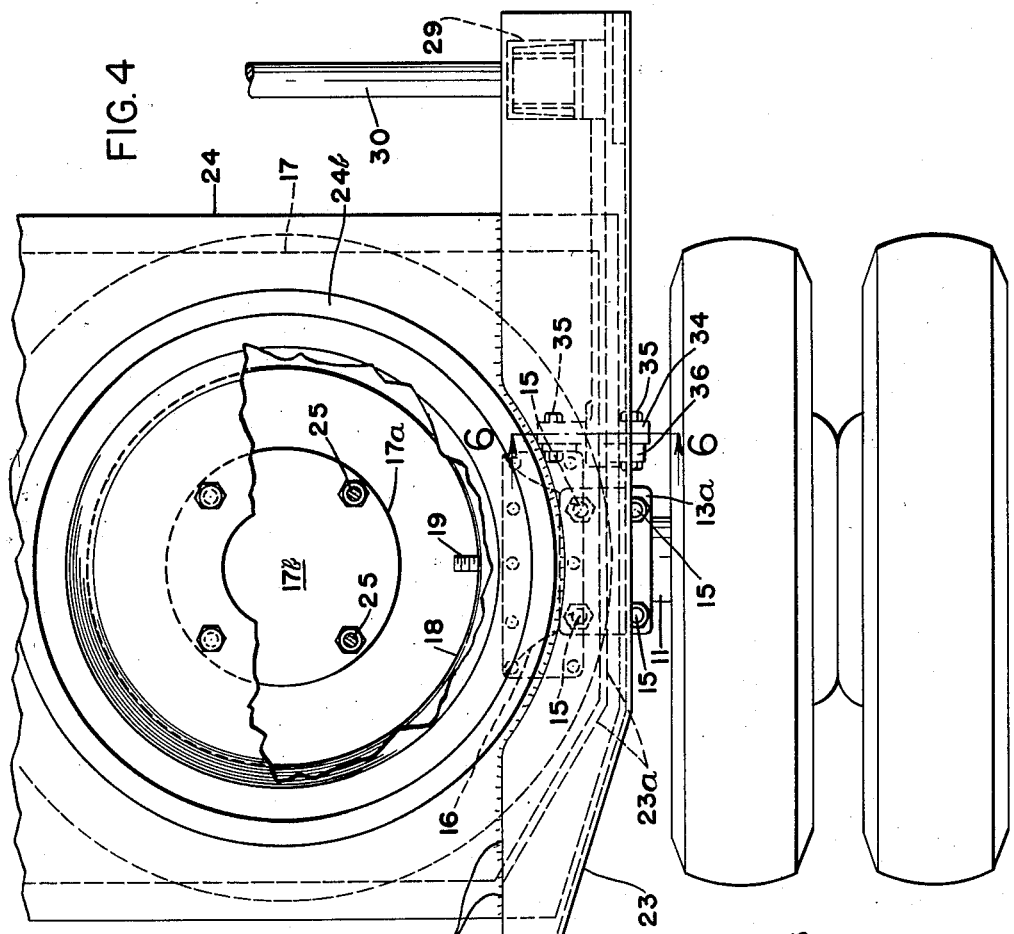
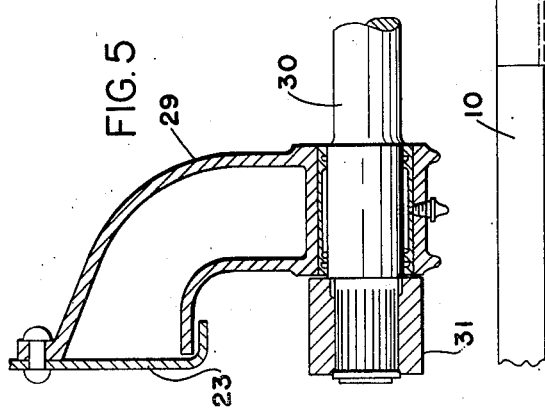
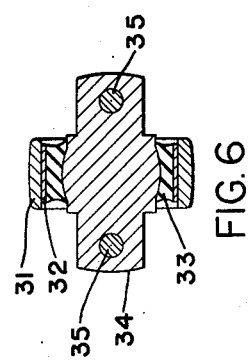
INVENTOR.
THOMAS L. FAWICK
BY Willard D. Eakin
ATTORNEY United States Patent Office 2,790,634
Patented Apr. 30, 1957

2,790,634

PNEUMATIC CUSHIONING ASSEMBLY FOR VEHICLES AND THE LIKE

Thomas L. Fawick, Cleveland, Ohio

Application June 23, 1955, Serial No. 517,534

2 Claims. (Cl. 267—11)

This invention relates to pneumatic devices especially advantageous for cushioning vehicles in relation to road shocks and vibrations.

Its chief objects are to provide an assembly having, in conjunction with the advantages of air-cushioning, some or all of the advantages of stability of the vehicle body against side-sway, as in movement of the vehicle in a curved path and also in the case of an uneven roadway; to provide highly effective cushioning of road shock and vibrational forces; and to provide simplicity, economy and durability of construction, and ease of replacement and repair.

More specific objects are to provide for the use of a single, middle-position cushioning element, as distinguished from a pair of them at respective sides of the vehicle, while providing against side-sway of the vehicle, and to provide a pneumatic cushioning member of especially desirable shape, adapted for maximum ultilization of the air as the cushioning element, with avoidance of undesirable localized strain of the wall of the air-containing member.

Some of the features described in the present application are described and more broadly claimed in my co-pending application Serial No. 462,421, filed October 15, 1954.

Of the accompanying drawings:

Fig. 1 is a side elevation, with parts sectioned and parts broken away, of an assembly embodying my invention in its preferred form.

Fig. 2 is a rear elevation of the same, from the right of Fig. 1, with parts broken away and with parts sectioned on line 2—2 of Fig. 1.

Fig. 3 is a section of a part, on a larger scale, on line 2—2 of Fig. 1.

Fig. 4 is a plan view of the assembly, with parts broken away.

Fig. 5 is a section on the line 5—5 of Fig. 1.

Fig. 6 is a section on line 6—6 of Fig. 1 or of Fig. 4.

The assembly shown in the accompanying drawings comprises longitudinal vehicle frame members 10, 10 of the usual channel form, a rear axle housing 11, and a pair of driving axles, such as the axle 12, Fig. 1, journaled therein in the usual manner.

Secured to the locally squared axle housing 11 by clamping plates 13, 13$^a$, and clamping bolts 15, 15, near each end of the axle housing, is a bracket 16, preferably integral with the upper clamping plate 13$^a$, the two brackets upwardly slanting toward each other and having riveted to their upper ends a preferably rectangular, centrally apertured, load-supporting plate 17 which has at its inner periphery an upstanding annular flange 17$^a$ and, integral with the upper margin of the flange 17$^a$, an inwardly projecting annular guiding and hold-down flange 17$^b$.

Lying upon and extending about the outer margin of the plate 17 is a flexible, fluid-distensible, annular, cushioning element comprising a casing 18 generally similar to a single-tube, cord-reinforced tire carcass, and having an inflating valve-stem 19 projecting from its inner periphery.

Riveted and welded to the rear end of each of the vehicle frame members 10, in extension thereof, is a channel member 23 having its lower flange cut away as at the dotted line 23$^a$, Fig. 4, to provide clearance for vertical movement of the supporting plate 17 in relation to the extension frame members 23.

Lying upon the annular pneumatic cushion 18 and at opposite sides underlying the upper flanges of and supporting the extension frame members 23 is a generally rectangular, centrally apertured, load-sustaining plate 24. This plate 24 preferably is welded to the upper flange of the frame-extension member, as at 24$^a$.

For holding in substantially centered relationship the lower plate 17, the upper plate 24, and the pneumatic cushion 18 between them, the cushion is formed at medial positions on its lower and upper faces with respective annular ribs 21, 21$^a$ fitting in channel-groove flanges 17$^a$ and 24$^b$ formed in the plates 17 and 24 respectively.

An important feature of the present invention is that the annular pneumatic cushion is mold-vulcanized to a shape such that the cushion when in unstrained condition, as it comes from the vulcanizing mold, and is not inflated, is in cross-section of elliptical or approximately elliptical shape, with the longer axis of the cross section radial with relation to the annular form of the cushion, as clearly shown in Fig. 3.

In Fig. 2 the cushion, mounted in the assembly, is shown as being inflated to a suitable working pressure but not under substantial load, the effect of the inflation being to distend the cushion to circular or substantially circular cross-sectional form, as an incident of which the inner periphery of the cushion is pulled outward to an increased diameter or circumference and its outer periphery is pulled inward to a decreased diameter or circumference. There is ample clearance at both of its peripheries for it to be reflattened by the loading of the vehicle to or toward its original cross-sectional shape, or to a still more flattened shape in the case of a very heavy load and/or a badly uneven roadway.

The annular cushion, being without confinement or constriction of either of its peripheries, is free to be changed to these different cross-sectional shapes by the loading of the vehicle and its operation over an uneven roadway, which is a factor in providing maximum utilization of the air of inflation for cushioning effect; and a further advantage in that regard is that as the cushion approaches maximum loading, it also approaches its original, unstrained, cross-sectional shape. Recoil of the resilient wall of the cushion acts with the load for reflattening of the cushion and when the loaded cushion is thus changed to approximately its original cross-sectional shape, it is free from excessively localized strain of flexure and thus is in good condition for withstanding its internal pressure, and also for deforming, either way, from the shape to which it was molded, in the performance of its cushioning function.

To provide a cushioned limit of movement of the plate 24 in relation to the plate 17, as in the case of rebound of the vehicle frame after vertical compression of the cushion member 18, hold-down spring post bolts 25, 25, extend, with slight clearance, through holes in, and connect, the two plates, as cushioning tie means.

To stabilize and prevent excessive side sway of the vehicle body, the extension frame members 23 and the axle housing are connected by articulated means comprising a rigid U-shaped radius-rod and stabilizer structure which extends forward from brackets 29, 29, riveted to the respective extension members.

The said structure comprises a high-modulus but resilient torsion shaft 30 which near its ends is journaled for hinging movement in the lower ends of the brackets 29. Each end of this shaft projects outward beyond the adjacent bracket and on each of its projecting portions is splined a radius-rod or link 31, constituting an arm of the U-shaped structure, as clearly shown in Fig. 5.

At its front end each link 31 is formed with an eye in which is press-fitted the outer metal ring 32, Fig. 6, of a torsional rubber bushing assembly, comprising an annular rubber cushion 33, preferably interlocked with and vulcanized to a hinge pin member 34 which is secured by bolts 35, 35 to a bracket 36 rigid with axle housing and preferably integral with the lower clamping plate and so shaped that the thrust of the link 31 is directly toward the axle. Preferably the rubber cushion bushing 33 is vulcanized to both the inner and outer metal members 34 and 32, with the latter transversely split in one or more places, the rubber being held under strong radial compression by pressing of the assembly into the eye of the link 31, in a manner well known for producing compression type rubber bushing assemblies.

In operation the resilience of the rubber bushings permits the necessary hinging movements of the links 31 in relation to the brackets 29 and their resilience and that of the tire-like cushion member 18 permit, and cushion, the very slight relative fore-and-aft movement of the vehicle frame in relation to the axle 12 which is incident to the hinging movements of the links resulting from vertical compression and recoil of the tire-like member 18. Such relative movements also are provided for by the slight clearances of the hold-down spring-post bolts 25 in their holes in the plates 17 and 24.

Because of the rigid connection of the links 31 to respective end portions of the resilient but high modulus torsion shaft 30, the frame-extension members 23 are compelled to have only moderately differing downward and upward movements in relation to the axle-housing 11 and excessive side sway or tilting of the vehicle body in relation to the axle in rounding a curve is prevented.

The space between the adjacent parts of the lower flanges of the frame extensions is wide enough to permit the pneumatic cushioning member 18 to be brought into place from below before inflation, with permissibly some distortion of the member in its deflated condition.

Although the axle means here shown is a pair of rear, driving axles, the invention is not wholly limited to rear axles or to driving axles.

Various modifications are possible without sacrifice of all of the advantages set out in the above statement of objects and without departure from the scope of the invention as defined in the appended claims.

I claim:

1. A cushioning assembly for vehicles and the like, said assembly comprising a flexible-walled air container defining an annular, horizontally disposed air chamber, load-supporting means underlying said container for supporting it, and load-supporting means lying upon said container and supported by it for supporting a load to be cushioned by the container, said container, when in unstrained condition, being of at least approximately elliptical cross-sectional form with the greater cross-sectional dimension radial with relation to the annular shape of the container and the wall of the container at the annular inner periphery and at the annular outer periphery of the said air chamber being exposed to the atmosphere, unconfined, and freely flexing in deformation of the container by the force of the load.

2. An assembly as defined in claim 1 and including mutually interlocking means upon the container and at least one of the two defined load-supporting means between which it is mounted, at a position at least approximately midway between the inner and outer peripheries of the annular container, for restricting the container against horizontal relative movement, the container being of integrally molded, single-tube construction and the interlocking means comprising at least substantially an annular rib molded on the surface of the container.

References Cited in the file of this patent

UNITED STATES PATENTS

| 664,444 | Stubbs | Dec. 25, 1900 |
| 1,066,920 | Klenke et al. | July 8, 1913 |
| 1,884,477 | Wood | Oct. 25, 1932 |
| 2,275,637 | McIntyre et al. | Mar. 10, 1942 |
| 2,704,665 | Zoltok | Mar. 20, 1955 |

FOREIGN PATENTS

| 595,490 | Germany | Apr. 12, 1934 |
| 880,843 | France | Jan. 11, 1943 |